United States Patent [19]
McNally

[11] Patent Number: 6,072,158
[45] Date of Patent: Jun. 6, 2000

[54] METHOD AND APPARATUS FOR HEATING THIN PLASTIC SHEET WITH AIR DIFFUSER PLATE PREVENTING SAGGING OF THE SHEET

[75] Inventor: Douglas J. McNally, Chatham, Canada

[73] Assignee: Konal Engineering and Equipment Inc., Blenheim, Canada

[21] Appl. No.: 09/177,330

[22] Filed: Oct. 22, 1998

[51] Int. Cl.⁷ .................................................... B29C 17/00
[52] U.S. Cl. .......................... 219/388; 392/417; 264/544; 264/DIG. 46; 34/360; 34/621; 425/DIG. 13; 425/384
[58] Field of Search .................................. 219/388, 243; 392/417; 264/165, 553, 544, DIG. 46; 425/DIG. 13, 383, 317, 384; 34/360, 361, 363, 370, 654, 621, 640, 273, 274; 432/64

[56] References Cited

U.S. PATENT DOCUMENTS

| | | | |
|---|---|---|---|
| 2,928,124 | 3/1960 | Hugger | 34/620 |
| 3,048,383 | 8/1962 | Champlih | 219/388 |
| 3,664,791 | 5/1972 | Brown | 425/384 |
| 3,728,799 | 4/1973 | Streltsov | 34/619 |
| 3,867,085 | 2/1975 | Lynch | 425/384 |
| 4,101,252 | 7/1978 | Brown | 425/384 |
| 4,148,575 | 4/1979 | Siryj | 219/388 |
| 4,371,246 | 2/1983 | Siryj | 219/388 |

FOREIGN PATENT DOCUMENTS

| | | |
|---|---|---|
| 2617758 | 1/1989 | France . |
| 2432726 | 1/1976 | Germany . |
| 57-77524 | 5/1982 | Japan . |

Primary Examiner—John A. Jeffrey
Attorney, Agent, or Firm—Flynn, Thiel, Boutell & Tanis, P.C.

[57] ABSTRACT

A method and apparatus heats a thin sheet of material prior to subjecting the sheet to a process for forming the sheet into a desired shape, such as by vacuum forming. The sheet is supported in a generally horizontal manner during transport through the apparatus, for example on a pair of conveyor chains or belts which carry and provide support to the longitudinal edges of the sheet by gripping same. The sheet is heated from above and below by heating elements and a diffuser plate is located between the upper and lower heating elements, and beneath the downwardly facing side of the sheet. The diffuser plate permits air flow therethrough from an air source and forms a film of heated air adjacent the downwardly facing side of the sheet to support the sheet and prevent excessive downward sagging thereof during heating thereof.

8 Claims, 4 Drawing Sheets

METHOD AND APPARATUS FOR HEATING THIN PLASTIC SHEET WITH AIR DIFFUSER PLATE PREVENTING SAGGING OF THE SHEET

FIELD OF THE INVENTION

This invention relates to a method and apparatus for heating a thin sheet of plastic, such as vinyl, prior to a conventional vacuum forming process wherein the sheet is shaped to a desired configuration.

BACKGROUND OF THE INVENTION

Thin plastic sheets are often utilized in the automotive industry to form an outer skin or shell covering on automotive products such as door panels, instrument panels or the like. The sheet is typically shaped by vacuum molding whereby the sheet is positioned over a mold member defining a mold cavity, and a vacuum is applied so that the sheet is sucked into the mold. Prior to vacuum molding of the sheet, the sheet must typically be heated to a certain temperature in order to provide flexibility to the sheet to enable proper shaping thereof.

One conventional heating method and apparatus employs quartz heaters oriented above and below the plastic sheet as the sheet is moved through the heating unit towards the forming unit by means of a conveyor arrangement. The conveyor arrangement includes a conveyor member or chain which grips and supports the sheet on opposite sides thereof. However, the increased usage of vinyl sheets having a ultraviolet (UV) resistant constituent has created problems in conventional heating methods and units, in that when the sheet is heated to the necessary forming temperature, the sheet undergoes excessive sagging or elongation which causes undesired thinning and can result in a nonuniform sheet. Also, this can result in the heated sheet contacting the heaters or other structural elements which thus damages or blemishes the sheet. One attempt to solve this problem included positioning the heaters farther apart from one another and thus farther from the sheet. However, this solution necessarily required increased energy and process time in order to heat the sheet to the required temperature, which is disadvantageous from a manufacturing standpoint.

It is an object of the present invention to provide an improved apparatus and method for heating a thin, elongate sheet of material, such as plastic, and more specifically vinyl containing a UV resistant constituent. The improved apparatus and method are believed to significantly improve the overall performance characteristics of the apparatus and process in terms of efficiency by providing a more effective method of supporting the sheet during the heating thereof prior to the forming process, thus avoiding excessive sheet deformity due to sagging or stretching which can result in an inferior or damaged sheet product, while permitting efficient heating of the sheet.

The improved apparatus and process according to the present invention includes a heating unit having a housing with a tunnel-like configuration which defines an entrance end through which the sheet enters as it is moved along by a conventional conveyor unit, and an exit end through which the sheet exits after the heating thereof. The heating unit includes a support arrangement which supports the sheet in a generally horizontal manner during its travel through the heating unit, which support arrangement includes guide members arranged at opposite longitudinal sides of the sheet. Each guide member serves to guide an endless conveyor member or chain of the conveyor unit, which conveyor members grip and carry the sheet along the opposite longitudinal edges thereof. Heating elements are disposed above and below the sheet along the length of the heating unit, and a diffuser plate is arranged between the downwardly facing side of the sheet and the lower heating elements. The diffuser plate permits air flow upwardly therethrough as supplied from an air supply system, and thus enables the formation of a film of air under the sheet to support same and prevent excessive sagging or transverse elongation of the heated sheet during transport through the heating unit.

The advantageous arrangement and method of the present invention, and objects and purposes thereof, will be apparent to persons familiar with apparatus and methods of this general type upon reading the following specification and inspecting the accompanying drawings.

Figure 1:
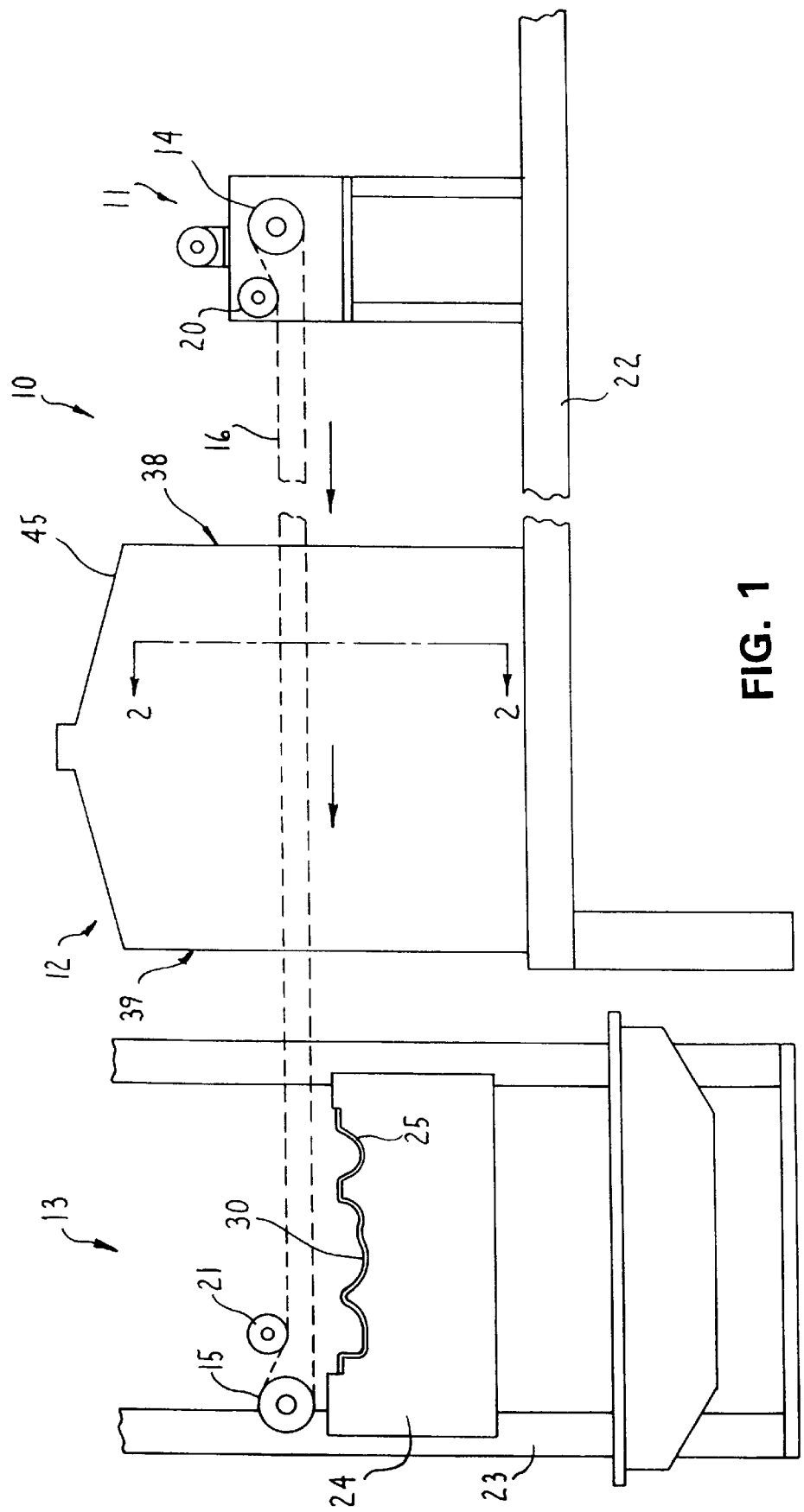
FIG. 1 is a schematic side view illustrating a molding system including a heating unit in accordance with the present invention.

Certain terminology will be used in the following description for convenience in reference only, and will not be limiting. For example, the words "upwardly", "downwardly", "rightwardly", and "leftwardly" will refer to directions in the drawings to which reference is made. The word "forward" will be used to refer to the direction of transport of the sheet through the molding system, which direction of transport through the molding system is from right to left in FIGS. 1 and 3. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Referring to the drawings and specifically FIG. 1, there is illustrated a molding system 10 including a conveyor unit 11, a heating unit 12 and a vacuum forming unit 13. The conveyor unit 11 includes a drive arrangement including a conventional electric motor (not shown) which effects driving of sprockets 14 and 15 which are joined together by a pair of horizontally oriented and parallel conveyor members or drive chains 16 (shown schematically in dotted lines in FIG. 1) which are disposed adjacent opposite sides of the system. Sprocket 15 is preferably mounted in a suitable manner on the forming unit 13 as discussed below. Additional sprockets 20 and 21 are respectively positioned adjacent sprockets 14 and 15 and serve as guides for positioning the drive chains 16. Each drive chain 16 preferably includes a series of pointed projections 17 (FIG. 2) which project outwardly along the length thereof, which projections 17 serve to grip a sheet 18 of flexible material by piercing the sheet 18 along the opposite longitudinal edges thereof. The conveyor unit 11 is supported, along with heating unit 12 by a suitable support table or frame 22. The heating and vacuum forming units 12 and 13 are arranged downstream of the conveyor unit 11, the heating unit 12 being disposed between conveyor unit 11 and vacuum forming unit 13.

The vacuum forming unit 13 includes a support frame 23 which rotatably mounts sprocket 15 thereon, and which supports a generally hollow mold box 24 which includes a mold 25 which is preferably integral therewith and projects into the interior of the mold box 24. The mold 25 typically has a significant three-dimensional shape which provides a generally irregular contour in the longitudinal and transverse extent thereof, which shape corresponds to the desired shape of the skin being molded. The mold 25 defines a mold cavity 30 and typically includes holes therein (not shown) so that when the sheet 18 is located above the mold 25 and suction is applied from beneath the mold 25 by means of a suitable suction source (not shown) through the holes in the mold 25, the sheet 18 is sucked into the mold cavity 30.

Figure 3:
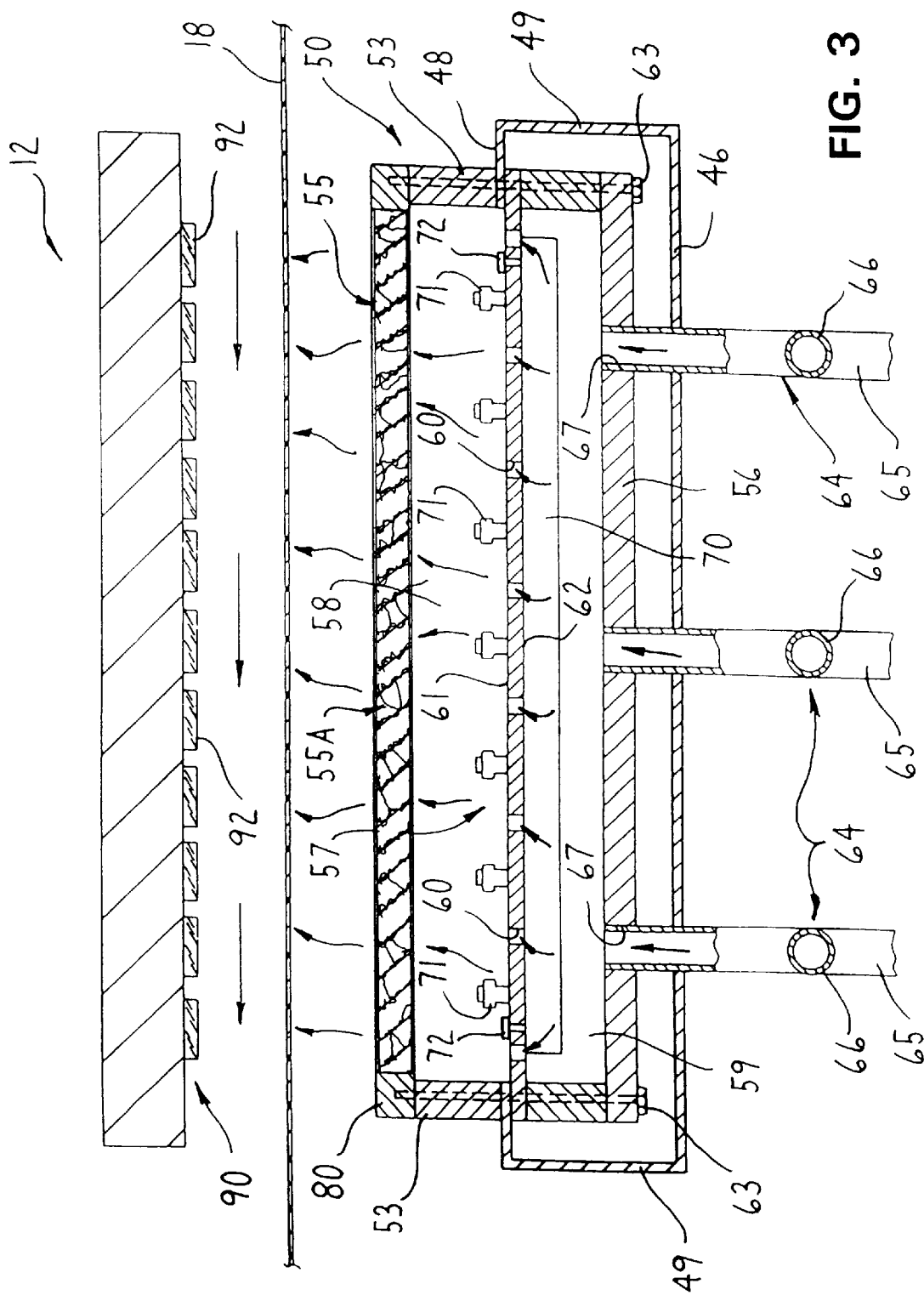
FIG. 3 is an enlarged, fragmentary, cross-sectional view taken substantially along line 3—3 of FIG. 2.

The drive chains 16 of the conveyor unit 10 support the sheet 18 in a generally horizontal manner and transport the sheet 18 through the heating unit 12 in the direction of transport as indicated by the arrows in FIGS. 1 and 3, and then carry the sheet 18 to an area generally above the mold 25 for molding or forming thereof as discussed above.

The above discussed conveyor and vacuum forming units 11 and 13 are conventional and further detailed description thereof is believed unnecessary.

Figure 2:
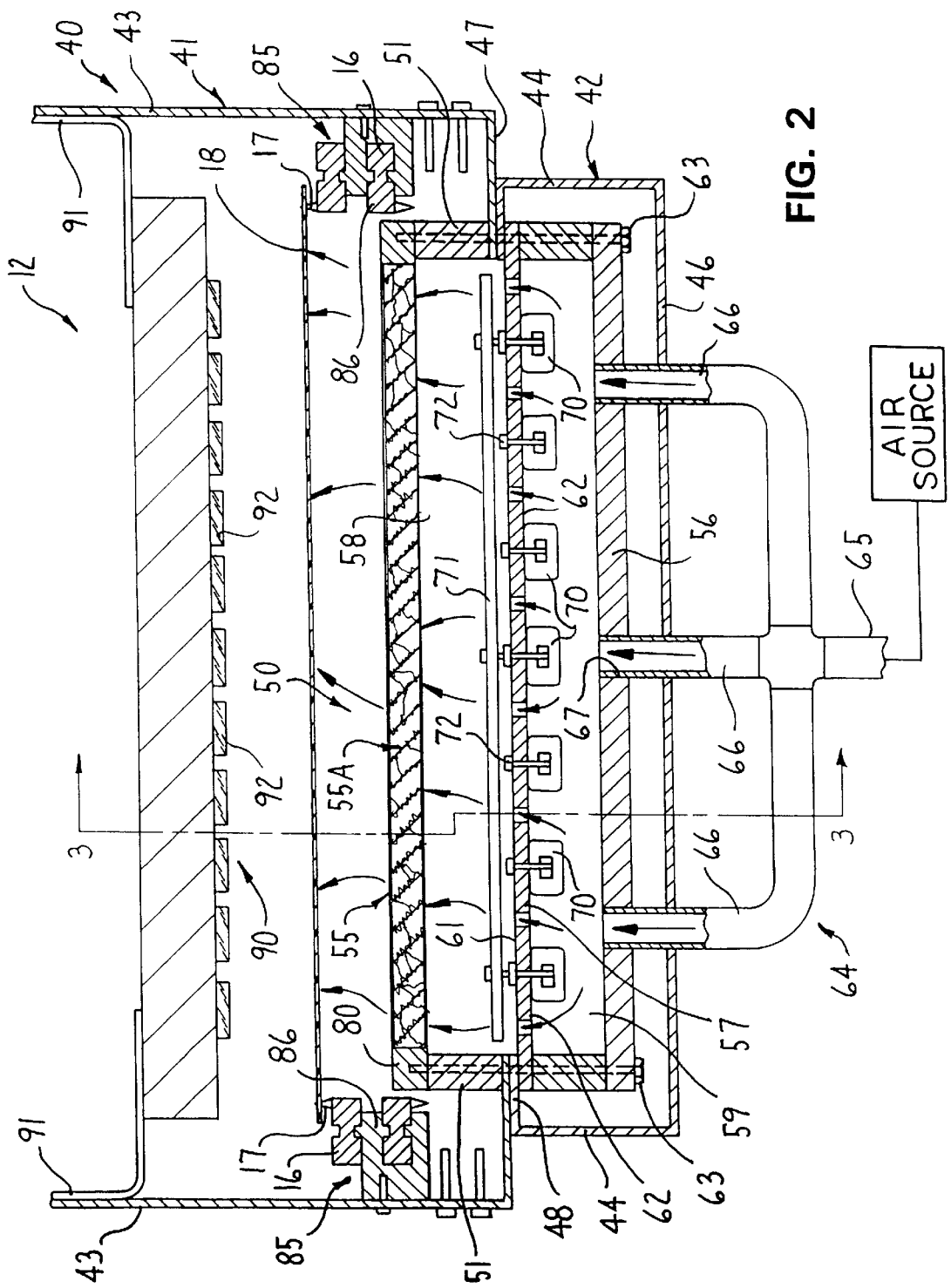
FIG. 2 is an enlarged, fragmentary, cross-sectional view taken substantially along line 2—2 of FIG. 1.

With reference to FIGS. 1–4, the present invention relates to the heating unit 12. Heating unit 12 includes a housing 40 which defines a tunnel-like configuration including an open upstream or entrance end 38 and an open downstream or exit end 39, through which ends the sheet 18 is moved by the drive chains 16 of the conveyor unit 10. As best shown in FIGS. 2 and 3, the housing 40 includes top and bottom housing parts 41 and 42. The top housing part 41 includes a pair of generally vertically extending and parallel side panels 43 which are adjoined to one another by an upper panel 45 (FIG. 1) extending transversely therebetween. Bottom housing part 42 has a box-like configuration and includes a pair of vertically oriented parallel side panels 44 and a pair of vertically oriented and parallel end panels 49. Bottom housing part 42 includes a lower panel 46 which extends transversely between and interconnects the respective pairs of side and end panels 44 and 49. As shown in FIGS. 2 and 3, top and bottom housing parts 41 and 42 each have an inwardly and horizontally extending flange 47 and 48, respectively, for fastening the housing parts 41 and 42 to one another as discussed below.

The heating unit 12 includes a lower air supply and heating arrangement 50 located within housing 40 and beneath the sheet 18. The air supply and heating arrangement 50 includes a pair of generally rectangular, vertically oriented and parallel side walls 51, a pair of rectangular, vertically oriented and parallel upstream and downstream end walls 53, horizontally oriented top, bottom, and intermediate planar and rectangular plates 55, 56 and 57 which extend transversely with respect to and interconnect side walls 51 and end walls 53. The side and end walls 51 and 53 may be one-piece components, or may be embodied by separate upper and lower portions as shown. The top, bottom and intermediate plates 55–57 along with the side and end walls 51 and 53 together define generally rectangular upper and lower chambers 58 and 59, which chambers 58 and 59 are separated from one another by intermediate plate 57. The intermediate plate 57 preferably has a perforated construction and includes a plurality of evenly distributed holes 60 which extend therethrough between respective upper and lower surfaces 61 and 62 thereof, which holes 60 enable fluid communication between upper and lower chambers 58 and 59. The holes 60 are preferably arranged in evenly spaced rows oriented generally parallel to the direction of transport and generally perpendicular to the direction of transport across plate 57.

Housing 40, side and end walls 51 and 53, and intermediate and bottom plates 56 and 57 are preferably constructed of metal such as aluminum, although other materials may be utilized within the scope of the invention.

Side walls 51 and end walls 53 are fixed to top, bottom and intermediate plates 55–57 by means of elongate fastening elements such as bolts 63, which bolts 63 extend upwardly through the bottom plate 56 and through corresponding holes in the side and end walls 51 and 53 and the peripheries of top, bottom and intermediate plates 55–57 to provide the lower air supply and heating arrangement 50 with an enclosed box-like shape. The bolts 63 also extend through flanges 47 and 48 of top and bottom housing parts 41 and 42 and serve to fasten the top and bottom housing parts 41 and 42 to one another.

Air is supplied to lower chamber 59 by a plurality of pipe arrangements 64, each of which includes a main supply pipe 65 and three branch pipes 66. The branch pipes 66 open into lower chamber 59 through corresponding holes 67 in the bottom plate 56. The pipe arrangements 64 are preferably evenly spaced from one another along the heating unit 12 (i.e. along the direction of transport, see FIG. 3), and the branch pipes 66 are evenly spaced across bottom plate 56 (i.e. transverse to the direction of transport, see FIG. 2) to provide a uniform supply of air to lower chamber 59. Each main supply pipe 65 preferably communicates with an air source, shown schematically in FIG. 2.

As shown in FIGS. 2 and 3, the lower air supply and heating arrangement 50 includes a plurality of elongate electric strip heaters 70 located within lower chamber 59 and a plurality of elongate thermocouples 71 located within upper chamber 58. The strip heaters 70 are connected to a conventional electric power supply (not shown) and are mounted adjacent but below the lower surface 62 of the perforated intermediate plate 57 by means of corresponding support elements 72 which are mounted on the plate 57. The strip heaters 70 are preferably disposed in an evenly spaced-apart manner with respect to one another along intermediate plate 57, so that the longitudinal axes thereof are generally parallel to one another and also to the direction of transport. The thermocouples 71 are mounted on the upper surface 61 of intermediate plate 57 and are supported there at in a transverse manner with respect to the strip heaters 70 and are disposed in an evenly spaced-apart manner along plate 57. The thermocouples 71 preferably serve to regulate the temperature of the air in upper chamber 58.

Figure 4:
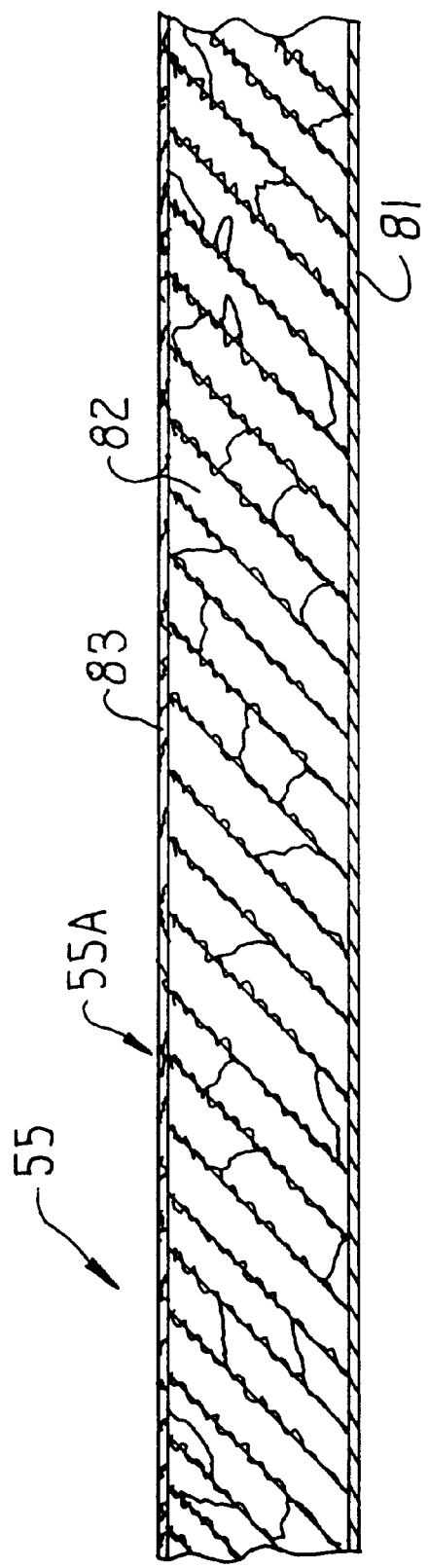
FIG. 4 is an enlarged, fragmentary, cross-sectional view of the diffuser plate.

The top plate 55 preferably includes a rigid and preferably aluminum frame 80 which peripherally surrounds a multi-layer or laminate diffuser plate 55A which is porous or permeable to fluid, and specifically air. With reference to FIG. 4 which shows a fragmentary cross-sectional view of diffuser plate 55A, same includes a lowermost layer of screen material 81 attached at its periphery to frame 80, which lowermost layer 81 supports an intermediate insulative layer 82 and an uppermost layer of woven cloth 83. Preferably, the lowermost layer 81 is constructed of 10 gauge aluminum screen and the intermediate insulative layer 82 is constructed of a fibrous thermal insulative material such as rock wool. The above-mentioned materials are provided only by way of example, and other materials having similar properties as those mentioned may be utilized for layers 81 and 82.

The uppermost layer 83 is preferably constructed of woven fibers, such as that known by the trade name "Kevlar" which is thermally stable up to a temperature of about 450° Fahrenheit. It should be understood that Kevlar is only one example of a material which may be utilized as uppermost layer 83, and other high performance, thermally stable and porous materials may be utilized in accordance with the invention.

As shown in FIG. 2, the heating unit 12 includes a support arrangement 85 for supporting the sheet 18 in a generally horizontal manner as same is transported through the heating unit 12 by the conveyor unit 10. The support arrangement 85 is embodied by two rigid, elongate and parallel guide members or tracks 86 each having a generally C-shaped cross are loon, which guide members 86 are located on opposite sides of housing 40 and are horizontally mounted on a respective side panel 43 of top housing part 41. Alternatively, the guide members 86 may be embodied by a series of separate and spaced-apart guide members horizontally aligned with one another along side walls 43. The guide members 86 each support a respective drive chain 16 of the conveyor unit 10. The guide members 86 are preferably positioned at a height along side panels 43 in a manner such that sheet 18 is supported on drive chains 16 so as to be disposed above but closely adjacent the top diffuser plate 55.

The heating unit 12 also preferably includes an upper heating arrangement 90 which is supported by means of vertically-adjustable support elements 91 mounted on side panels 43 above the guide elements 86, and which heating arrangement 90 is connected to a conventional electric power supply (not shown). The upper heating arrangement 90 includes an array of uniformly disposed individual quartz heaters 92 which radiate heat adjacent the upper side of sheet 18 during transport through the heating unit 12.

In operation, the strip heaters 70 and the quartz heaters 92 are preferably switched on and pressurized air is supplied to lower chamber 59 through each of the pipe arrangements 64. The air in lower chamber 59 is heated by the strip heaters 70 and is forced through the holes 60 in intermediate plate 57 and into upper chamber 58. The air in upper chamber 58 is forced through the top diffuser plate 55A, such that a film of air is created near the upper surface of the diffuser plate 55. The conveyor unit 10 is activated in order to move the sheet 18 forward and into the entrance 41 of the heating unit 12 and between the upper heating arrangement 90 and the diffuser plate 55. As the sheet 18 is transported through heating unit 12, the sheet 18 is uniformly supported at the lateral edges thereof by the projections 17 of the conveyor chains 16, and in the region between the lateral edges by the film of heated air formed at the upper surface of the diffuser plate 55. This film of air thus serves to both heat and support the sheet 18. The sheet 18 is thus heated by the upper and lower heating arrangements 50 and 90, and excessive downward sagging and deformation of the sheet 18 in the area between the lateral edges thereof during the heating process is prevented by the film of air formed above the diffuser plate 55. The sheet 18 is heated to the required temperature by heating unit 12 and is then transported to the vacuum forming unit 13 and formed there at by suctioning same into the mold 25 as discussed above.

Should excessive downward sagging of the sheet 18 occur during the heating cycle thereby causing contact between the sheet 18 and the uppermost layer 83 of the diffuser plate 55, damage (i.e. in the form of discoloration, thermal blemishes, etc.) to the sheet 18 is prevented since the uppermost layer 83 of diffuser plate 55 is constructed of thermally stable material having a low heat conductivity, which results in a higher quality end product.

The process of heating the sheet 18 prior to vacuum forming thereof typically requires heating the sheet 18 to a temperature of about 350° Fahrenheit, and the primary heat needed to heat the sheet 18 is preferably generated by the quartz heaters 92. Therefore, since the uppermost layer 83 of the diffuser plate 55 will not degrade or break down at this temperature (i.e. Kevlar is thermally stable to about 450° Fahrenheit), should contact occur between the sheet 18 and the diffuser plate 55, damage to the sheet 18 due to conductive heat transfer can be prevented. In addition, the process in accordance with the invention contemplates a relatively short heating time of about 10 to 25 seconds, and preferably about 18 seconds. It should be understood that the temperature within heating unit 12 may be regulated by any conventional means, such as a thermostat or thermocouple.

Although the present invention is described herein as a method and apparatus for heating a sheet prior to a vacuum forming process, it will be understood that the invention may be utilized in other forming processes.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of heating a thin sheet of plastic material prior to subjecting the sheet to a process for forming the sheet into a desired shape, said method comprising:

providing a h eating unit defining a heating chamber therein and having an open entrance end and an open exit end;

supplying he at to the heating chamber from a heat source;

gripping the sheet at opposite lateral edges thereof;

providing a multi-layer porous plate having a lowermost support layer of screen-like material, and an intermediate layer of porous thermal insulative material disposed between the lowermost support layer and an uppermost layer of thermally stable woven fibers which will not damage the sheet in the event of contact therewith;

positioning the multi-layer porous plate within the heating chamber and below the sheet such that the uppermost layer is disposed closely adjacent a downwardly facing surface of the sheet;

continuously feeding the sheet into the entrance end of the heating unit, along and above the multi-layer porous plate, and out of the exit end to heat the sheet to a predetermined temperatures forcing air through the multi-layer porous plate and forming a film of air beneath the sheet to support the sheet during heating at areas between the lateral edges thereof; and preventing conductive heat transfer between the sheet and the uppermost layer of the multi-layer porous plate during heating of the sheet to prevent damage thereto.

2. The method of claim 1 wherein said step of forming a film of air includes forming a film of heated air to support and heat the sheet between the lateral edges thereof.

3. The method of claim 1 including heating the sheet for about 10 to about 25 seconds.

4. The method of claim 3 it wherein said step of heating includes heating the sheet for about 18 seconds.

5. The method of claim 1 wherein said step of forcing air includes forcing heated air from a chamber defined below the multi-layer porous plate through the multi-layer porous plate to form a film of heated air adjacent the uppermost layer thereof.

6. The method of claim 1 wherein said step of providing a multi-layer porous plate includes providing the plate with an uppermost layer of Kevlar.

7. The method of claim 1 wherein said step of continuously feeding includes continuously transporting the sheet past at least one heating element disposed within the heating chamber and below the sheet to heat the sheet to the predetermined temperature.

8. The method of claim 1 wherein said step of continuously feeding includes continuously transporting the sheet past at least one heating element disposed above the sheet and at least one heating element disposed below the sheet to heat the sheet to the predetermined temperature.

* * * * *

UNITED STATES PATENT AND TRADEMARK OFFICE
CERTIFICATE OF CORRECTION

PATENT NO. : 6,072,158
DATED : June 6, 2000
INVENTOR(S) : Douglas J. McNally

It is certified that error appears in the above-identified patent and that said Letters Patent is hereby corrected as shown below:

Title page,
Item [54], change "[54] METHOD AND APPARATUS FOR HEATING THIN PLASTIC SHEET WITH AIR DIFFUSER PLATE PREVENTING SAGGING OF THE SHEET" to -- [54] METHOD AN APPARATUS FOR HEATING THIN PLASTIC SHEET --.

Column 6,
Line 37, change "h eating" to -- heating --.
Line 40, change "h eat" to -- heat --.
Line 56, after "temperatures" insert -- ; --.

Column 7,
Line 3, change "claim 3 it" to -- claim 3 --.

Signed and Sealed this

Twenty-first Day of January, 2003

JAMES E. ROGAN
*Director of the United States Patent and Trademark Office*